Patented Jan. 22, 1935

1,988,680

UNITED STATES PATENT OFFICE 1,988,680

SERUM AND PROCESS FOR PREPARING IT

Garland Howard Bailey, Baltimore, Md.

No Drawing. Application March 30, 1931,
Serial No. 526,563

7 Claims. (Cl. 167—78)

My invention is concerned with immune sera, and it is my object to produce sera suitable for therapeutic use which will contain heterophile antibodies in effective quantity, and which may or may not also contain other antibodies of the usual types.

Heterophile antigen, discovered by Forssman in 1911 and known to exist in the tissues of the guinea pig, horse, dog, cat, mouse, and certain other animals, has certain constant antigenic properties irrespective of its species source. It is present in the red blood corpuscles of the sheep and goat and in both the red blood corpuscles and tissues of the chicken. In some animals, including the rabbit, pig, rat, ox, and man, this antigen is usually absent. Those animals which have heterophile antigen either in the tissues or in the red blood corpuscles are, in the literature, referred to as of the "guinea-pig type", while the animals which do not contain heterophile antigen are designated as of the "rabbit type", and this terminology will be employed herein.

It has been demonstrated that the treatment, as by oral administration, injection, or other inoculation, of an animal of the rabbit-type with heterophile antigen will cause the production of heterophile antibodies in that animal.

It has been known that certain bacteria, notably Shiga dysentery bacilli and certain hemorrhagic septicemia bacteria, contain heterophile antigen and are capable, when injected into an animal of the rabbit type, of producing heterophile antibodies as well as bacterial antibodies. I have now discovered that certain strains of pneumococci contain heterophile antigen which, like heterophile antigen from other sources, is capable of inciting the production of heterophile antibodies in animals of the rabbit type.

I have found that in the treatment of certain infections immune sera containing heterophile antibodies are far more effective than similar sera which do not contain heterophile antibodies. The horse is the animal most commonly used in the preparation of anti-bacterial sera; and as a horse is an animal of the guinea-pig type and contains heterophile antigen, serum from the horse is normally free of heterophile antibodies, and in fact may and usually does contain some heterophile antigen. I believe that this fact may account in part for the uncertain results and frequent untoward reactions obtained following the treatment of certain infections with sera from horses. Therefore in using a serum normally containing heterophile antigen, such as that from the horse, I have found it desirable to introduce into such serum, or to use in conjunction with it, sufficient heterophile antibodies to counteract any heterophile antigen that might otherwise be present, and preferably sufficient also to provide an excess of such heterophile antibodies. In this way, I have been able to reduce and largely to avoid the untoward reactions, such as shock, that so frequently follow the use of horse serum.

My invention is not limited to sera containing both heterophile and other antibodies, for I have also discovered that plain heterophile antibody serum free from other antibodies has considerable therapeutic value in the treatment of disease. I have found this to be particularly true where the serum is used in the treatment of infections caused by organisms which contain heterophile antigen.

Some normal animals of the rabbit type may have some natural heterophile antibodies, but only of low titre; so that in order to obtain even from those animals a serum having a therapeutically effective content of heterophile antibodies, it is necessary either to immunize such animals further against heterophile antigen or to fortify the serum by the addition of heterophile antibodies from another source.

In carrying out my invention, I produce a serum containing heterophile antibodies. This serum is prepared by injecting or otherwise administering heterophile antigen from any source into an animal of the rabbit type and in sufficient quantity to incite the production of heterophile antibodies in the animal. After sufficient time for the production of heterophile antibodies has elapsed, blood serum is obtained from the animal. This serum is concentrated and/or refined by known methods in order to adapt it for therapeutic use.

While the serum prepared as above indicated is of considerable value, I prefer in most cases to employ a serum which contains, in addition to heterophile antibodies, the usual antibodies specific to the agent causing the disease or infection which is to be treated. There are a number of ways in which the preferred serum containing both heterophile antibodies and specific antibodies may be produced. For example, in the preparation of anti-pneumococcic serum, I may make the serum by immunizing a rabbit, ox, or other animal of the rabbit type with pneumococci of a strain containing heterophile antigen. Instead of immunizing the animal only with pneumococci, I may immunize it jointly with pneumococci and additional heterophile antigen from another source. Still another method of producing an anti-pneumococcic serum according to my invention comprises the mixing of anti-pneumococcic serum produced in one animal, which may be either of the guinea-pig type or the rabbit type, with heterophile antibody serum from an animal of the rabbit type which has been immunized with heterophile antigen from any source.

While I have found my anti-pneumococcic serum to be beneficial in the treatment of pneumonia of all types even if the pneumococcic antibodies are produced in an animal immunized with pneumococci of but one type, I prefer to immunize the animal with pneumococci representative of all types. Strains of pneumococci containing heterophile antigen are not limited to one type, but are found in all types.

I am not the first to produce an anti-pneumococcic serum, as one method of producing such a serum has been developed by Winford P. Larson, of Minneapolis, Minnesota, as shown by United States Letters Patent No. 1,621,117. The process of that patent comprises the attenuation of pneumococci with a surface-tension depressant, injecting the attenuated organisms into an animal, and obtaining blood serum from such animal. As suitable animals for the production of an anti-pneumococcic serum, the Larson patent mentions rabbits and larger animals, such as sheep, without indicating any appreciation of a difference between rabbit type animals and guinea-pig type animals as sources for anti-pneumococcic serum. If the Larson process is used on a sheep, horse, or other animal of the guinea-pig type, the serum obtained will inevitably be free from heterophile antibodies and will contain more or less heterophile antigen. If the animal used is a rabbit, or other animal of the rabbit type, the serum obtained will be free from heterophile antigen; but such serum may not contain any heterophile antibodies, and at best will not contain more than a low and substantially ineffective titre of natural heterophile antibodies unless the pneumococci with which the animal was injected were of a strain containing heterophile antigen.

Other investigators also have prepared anti-pneumococcic sera, but so far as I am aware I am the first to prepare such a serum by a process which definitely assures the presence of heterophile antibodies in therapeutically effective quantities.

In the production of anti-pneumococcic serum by one method involving my invention, an animal of the rabbit type, such as a rabbit or ox, is injected with pneumococci and/or their products of a strain known to contain heterophile antigen in sufficient quantity to incite the production of heterophile antibodies in the animal. (One method for determining the presence or absence of heterophile antigen in micro-organisms is set forth in an article by H. M. Powell published in the Journal of Immunology, volume XII, No. 1, July, 1926. After first treating the organisms to destroy hemotoxin, the method there described can be used in determining the presence or absence of heterophile antigen in pneumococci.) The animal may be given a single injection or several injections at intervals if desired. After sufficient time has elapsed for the production of both the usual pneumococcic antibodies and heterophile antibodies, the serum is obtained from the animal in the usual way, and is then rendered sterile and preferably purified and concentrated.

A serum thus obtained has been shown by me to be capable of producing markedly beneficial results in the relief of pneumococcic infections.

It is not essential in carrying out my invention with an animal of the rabbit type that the pneumococci used be of a strain containing heterophile antigen, since heterophile antigen from another source may be used. It is desirable, even when the animal is immunized with pneumococci containing heterophile antigen, to add additional heterophile antigen from another source. Thus, the animal can be injected with pneumococci and/or their products of a strain either free from or containing heterophile antigen and also with heterophile antigen from another source. For example, pneumococci and sheep red blood-cells containing heterophile antigen can be injected into the animal either jointly or separately and by either a single injection or by a series of injections at intervals. After a sufficient time has elapsed for the production of antibodies, serum is obtained from the animal and treated as above indicated.

This serum will contain heterophile antibodies the production of which was incited by the heterophile antigen contained in the sheep red blood-cells, the usual pneumococcic antibodies the production of which was incited by the pneumococcic antigen (i. e., the pneumococci and/or their products), and heterophile antibodies the production of which was incited by the heterophile antigen in the pneumococci if the pneumococci were of a strain containing heterophile antigen in sufficient quantity.

As previously indicated, it is not necessary in the treatment of pneumococcic infections that the heterophile antibodies and the bacterial antibodies be produced in the same animal. Thus, immune serum can be obtained from one animal, either of the rabbit type or of the guinea-pig type, after injection with pneumococci and/or their products; and heterophile antibody serum can be obtained from a rabbit, ox, or other animal of the rabbit type after treatment with heterophile antigen from any source. These two component sera may be, and preferably are, separately rendered sterile and concentrated and/or refined by known methods. In the treatment of pneumococcic infections, the two sera are preferably mixed in advance and injected with one injection, or they can be injected into the patient separately. The anti-bacterial serum component, if obtained from the horse or other animal of the guinea-pig type, may contain more or less heterophile antigen. Therefore, the heterophile antibody serum is used in quantity sufficient to counteract the effect of any such heterophile antigen, and preferably in still greater quantity so that an effective excess of free heterophile antibodies will result.

The production of anti-pneumococcic serum, by these methods is set forth as an example; for, by similar methods, immune sera containing both heterophile antibodies and antibodies specific to other disease-causing agents can be produced.

As a matter of fact, it appears that heterophile antibody serum alone, concentrated and/or refined to adapt it to therapeutic use and containing no other antibodies, is beneficial in the treatment of various disease processes, such for instance as pneumococcic infections; and therefore, while I have found the joint action of heterophile antibodies and other antibodies to give the best results, I do not limit my invention to such joint use.

Where both heterophile antibodies and antibodies specific to a disease-causing agent are to be used jointly in the treatment of a disease process, I prefer not to rely for the production of the heterophile antibodies solely upon such heterophile antigen as may be contained in the disease-causing agent itself. As indicated above, it is wholly possible to produce an anti-pneumococcic serum in accordance with my invention by the injection into an animal of the rabbit type of pneumococci alone if the pneumococci contain sufficient heterophile antigen; but because the proportion of heterophile antigen contained in pneumococci is comparatively small, it is necessary to use relatively large quantities of the organisms in order to produce a serum which will contain an effective proportion of heterophile antibodies. For this reason, I find it desirable to incite the production of heterophile antibodies, at least in part, by heterophile antigen from a source other than the disease-causing agent, the heterophile antibodies being produced either jointly with the specific antibodies in the same animal or separately in an entirely different animal.

By whatever method produced, my improved sera contain heterophile antibodies in effective quantity, and have been found to give prompt and decidedly beneficial results in the treatment of pneumococcic infections and other disease processes. Thus I have found in laboratory tests that within one hour following the injection of my anti-pneumococcic serum containing heterophile antibodies into pneumococcus-infected animals the number of pneumococci in the blood stream decreased from many thousands per c. c. to less than 25 per c. c.; and also that somewhat similar decreases may be obtained even from the use of plain heterophile antibody serum.

I claim as my invention:

1. The process of producing anti-pneumococcic serum which comprises treating an animal free of heterophile antigen with pneumococcic antigen in which heterophile antigen is present in sufficient quantity to incite the production of heterophile antibodies in the animal, and obtaining blood serum from such animal.

2. The process of producing anti-pneumococcic serum which comprises treating an animal free from heterophile antigen both with pneumococcic antigen and with heterophile antigen in addition to any present in the pneumococcic antigen, and obtaining blood serum from such aminal, the total quantity of heterophile antigen administered to the animal being sufficient to incite the production of heterophile antibodies.

3. The process of producing anti-pneumococcic serum which comprises treating with heterophile antigen an animal free of heterophile antigen, the quantity of heterophile antigen administered to the animal being sufficient to incite the production of heterophile antibodies, treating a second animal with pneumococcic antigen, obtaining blood serum from each of such animals, and combining the sera so obtained.

4. An anti-pneumococcic serum containing heterophile antibodies and pneumococcic antibodies.

5. A sterile serum suitable for therapeutic use and containing heterophile antibodies.

6. An immune serum to which has been added heterophile antibodies in sufficient amount to counteract the effect of any heterophile antigen present.

7. An immune serum to which has been added heterophile antibodies in sufficient amount to counteract the effect of any heterophile antigen present and to provide a substantial excess of heterophile antibodies.

GARLAND HOWARD BAILEY.